(12) United States Patent
Harvey et al.

(10) Patent No.: US 7,314,604 B1
(45) Date of Patent: Jan. 1, 2008

(54) STABLE FERRIC ARSENATE PRECIPITATION FROM ACID COPPER SOLUTIONS WHILST MINIMISING COPPER LOSSES

(75) Inventors: Paul Harvey, Johannesburg (ZA); Colette Kock, Johannesburg (ZA); John de Klerk Batty, Johannesburg (ZA)

(73) Assignee: Billiton Intellectual Property, B.V., The Hague (NL)

( * ) Notice: Subject to any disclaimer, the term of this patent is extended or adjusted under 35 U.S.C. 154(b) by 0 days.

(21) Appl. No.: 10/088,511

(22) PCT Filed: Sep. 21, 1999

(86) PCT No.: PCT/ZA00/00176

§ 371 (c)(1),
(2), (4) Date: Aug. 14, 2002

(87) PCT Pub. No.: WO01/23628

PCT Pub. Date: Apr. 5, 2001

(30) Foreign Application Priority Data

Sep. 30, 1999 (ZA) .................................... 99/6235

(51) Int. Cl.
*C01G 28/00* (2006.01)
*C22B 11/00* (2006.01)
*C30B 29/10* (2006.01)

(52) U.S. Cl. .............................. 423/87; 75/43; 75/744; 117/937

(58) Field of Classification Search .................. 423/87; 75/43, 744; 117/937
See application file for complete search history.

(56) References Cited

U.S. PATENT DOCUMENTS

| | | | | |
|---|---|---|---|---|
| 3,510,259 A | * | 5/1970 | Everett | 423/52 |
| 3,985,856 A | * | 10/1976 | Johnson et al. | 423/43 |
| 4,241,039 A | * | 12/1980 | Koh et al. | 423/531 |
| 5,482,534 A | | 1/1996 | Leonard et al. | |
| 5,762,891 A | * | 6/1998 | Downey et al. | 423/87 |
| 5,820,966 A | | 10/1998 | Krause et al. | |

FOREIGN PATENT DOCUMENTS

| | | |
|---|---|---|
| EP | 1 059 361 A1 | 12/2000 |
| JP | 59-164639 | 9/1984 |
| JP | 6-206080 | 7/1994 |
| JP | 2000-219920 | 8/2000 |

* cited by examiner

*Primary Examiner*—Robert Kunemund
*Assistant Examiner*—G. Nagesh Rao
(74) *Attorney, Agent, or Firm*—Jones, Tullar & Cooper, P.C.

(57) ABSTRACT

A method of which includes the steps of introducing an acidic solution containing (V), copper, ferric iron and ferrous iron into a first tank of a series of continuously stirred tank reactors and, in the first tank, adding air to the solution; heating the solution to an elevated temperature; recycling a portion of selectively precipitated ferric arsenate compounds to the said first tank; and seeding the solution with ferric arsenate compounds.

6 Claims, 5 Drawing Sheets

STABLE FERRIC ARSENATE PRECIPITATION FROM ACID COPPER SOLUTIONS WHILST MINIMISING COPPER LOSSES

BACKGROUND OF THE INVENTION

This invention relates to a method of disposing arsenic from acidic solutions. In particular, this invention relates to an environmentally acceptable method of disposing of arsenic from acidic solutions containing copper, ferric iron and ferrous iron in an environmentally acceptable manner without the loss of significant amounts of copper.

BACKGROUND OF THE INVENTION

Arsenic is found in many types of mineral deposits. Generally arsenic associates with iron, copper, nickel, cobalt, lead, antimony, silver and gold. This association is either as arsenic minerals or in solid solution with sulphide minerals. Copper, gold and lead mines are the primary producers of arsenic wastes. The amount of arsenic waste produced has increased steadily over the last two decades as the mining industry has been forced to begin exploiting complex ore bodies. This has been accompanied by a decrease in the market for arsenic, which is limited to the production of pesticides, lead acid storage batteries, glass, pharmaceuticals and wood preservation agents.

The complex ores containing arsenical minerals are usually sulphidic in nature. These ores require some form of oxidative treatment to achieve acceptable dissolution rates and metal liberation. It is usually during the oxidative process, such as bacterial oxidation or roasting, that the arsenic is released from its mineral form.

Safe disposal of arsenic-containing residues is an important consideration since many countries have strict mandatory limits on the allowable arsenic levels of wastes from processing operations. Arsenic-containing residues can be categorised as either solid waste, usually originating from a pyrometallurgical process, or aqueous wastes, originating from hydrometallurgical or hydrothermal processes, which are generally held in tailings dams.

The solid waste originating from pyrometallurgical oxidation is in the form of arsenic trioxide or in slag. In most cases arsenic minerals volatilise under high temperature to form arsenic trioxide ($As_2O_3$), which is collected in the flue dust treatment section of the plant. This powder is then stockpiled. The stockpiled material may be sold as is, purified, or treated to oxidise the arsenic to As(V) to form arsenic acid ($H_3AsO_4$).

In copper smelting a portion of the arsenic can be removed in the slag by blowing basic flux into the copper during the oxidation stage. Some of the arsenic also reports to the copper metal and the remainder to off-gases. The slag is dumped onto slag heaps. Off-gas cleaning by aqueous scrubbing typically produces acidic solutions rich in sulfur dioxide gas, iron in its ferrous state and arsenic in its arsenic (III) state. Neutralisation of this acid solution first requires oxidation of the ferrous iron and arsenic (III) in order to form stable precipitates for tailings disposal.

Pressure oxidation of ores containing arsenical minerals involves subjecting ores (usually gold ores) to high temperatures and pressures in an oxygen-rich atmosphere contained within an autoclave. During this process any arsenic which is solubilised will react with ferric iron to form crystalline ferric arsenate, (scorodite). Scorodite formation only requires a 1:1 ferric:arsenic (V) ratio, unlike amorphous ferric arsenate which requires a greater than 1:1 ferric:arsenic (V) ratio. This makes scorodite formation very attractive in ferric poor effluents. The technology exists to form scorodite from effluent streams in an autoclave operated at 150 C. The capital cost of an autoclave is, however, usually so high that scorodite precipitation may only be economically feasible if it is carried out together with the oxidation of the valuable concentrate. To the applicant's knowledge no process plants exist which employ an autoclave solely for formation of scorodite from effluent.

Hydrometallurgical treatment of arsenic-containing feeds results in aqueous effluent streams containing arsenic (III) and arsenic (V). These streams are generally treated by the addition of complexing agents such as Cd, Ca, Pb, Cu and Fe which react with the arsenic to form soluble compounds of varying solubility. The addition of calcium is usually in the form of lime or limestone to form calcium arsenate. Calcium arsenate is not environmentally stable as the compound reacts with carbon dioxide, releasing arsenic into ground water systems.

The addition of ferric iron to arsenic-containing feeds results in precipitation of arsenic (V) as a hydrated ferric arsenate and the arsenic (III) remains soluble in the aqueous effluent stream. The ferric arsenate precipitate is typically disposed of in tailings dams. The soluble arsenic (III) needs to be removed before the aqueous stream can be disposed of in an environmentally acceptable manner. Such additional process steps involve the use of additional reagents to oxidise the arsenic (III) in order to form stable precipitates for tailings disposal and can lead to significant increases in both capital and operating costs.

The effluent streams produced by the bacterial oxidation of copper concentrates contain arsenic in the form of arsenic (V), copper, ferric iron and ferrous iron. The ferric iron: arsenic (V) ratio is higher than 1:1.

The known prior art is typically concerned with pH adjusting the acid solution to a pH in the region of 7 to 10. Kuyucak, N. (1998)(1) and U.S. Pat. Nos. 4,366,128 (Weir et. al.), 5,137,640 (Poncha), 5,427,691 (Kuyucak et. al.), 5,645,730 (Malachosky et. al.) and 5,651,895 (Gordon), all provide for disposal of arsenic in feed materials by adding a base to increase the pH. The pH adjustment of the effluent streams produced by the bacterial oxidation of copper concentrates to this level of pH would result in all the desired copper being co-precipitated with the arsenic.

The effluent streams produced by the bacterial oxidation of copper concentrates contain arsenic in the form of arsenic (V) and iron in the form of ferric iron. Oxidation of arsenic (III) and ferrous iron has already been achieved and hence oxidising agents do not need to be added to the effluent streams. Examples of such prior art are discussed hereinafter.

Zouboulis et. al. (1993)(2) and U.S. Pat. Nos. 4,241,039 (Koh et. al.), 5,024,769 (Gallup), 5,482,534 (Leonard et. al.) and 5,820,966 (Krause et. al.). This is typical of the prior art known to the applicant in that it relates to the oxidation of either ferrous iron to ferric iron and/or arsenic (III) to arsenic (V) prior to the neutralisation of arsenic.

Swash et. al. (1994)(3) and U.S. Pat. Nos. 4,149,880 (Prater), 4,244,735 (Reynolds et. al.) and 4,331,469 (Kunda), all provide for disposal of arsenic in feed materials as an iron arsenic compound. These processes however require pressure oxidation to operate in the sulphuric acid environment provided and are accordingly not cost effective due to the expensive nature of pressure oxidation.

Droppert et. al. (1995)(4), describes the production of crystalline scorodite from arsenic-rich sulphate-based metallurgical solutions at ambient pressure (95 C). Scorodite formation only requires a 1:1 ferric:arsenic (V) ratio, unlike amorphous ferric arsenate which requires a ferric:arsenic (V) ratio which is greater than 1:1. The effluent streams produced by the bacterial oxidation of copper concentrates have ferric iron:arsenic (V) ratios far in excess of 1:1. Droppert et. al. (1995)(4), does not describe copper co-precipitation or selective amorphous ferric arsenate precipitation.

Cashman, in U.S. Pat. No. 4,655,829, discloses a method of oxidising arsenic sulphide ores in a hydrometallurgical process with no soluble arsenic compounds formed. This is achieved by blending copper, lead or zinc sulphides to the arsenic sulphide ore. This approach is directed to the oxidative leaching of metal sulphides rather than the environmentally acceptable removal of arsenic from arsenic sulphide ores.

SUMMARY OF THE INVENTION

The invention provides a method of selective precipitation of arsenic from acidic solutions containing copper, ferric iron and ferrous iron in an environmentally acceptable manner. This method includes pH adjusting the acid solution in a series of aerated continuously stirred tank reactors. The reactors are maintained at elevated temperatures to increase the rate of ferric arsenate precipitation and to minimise copper co-precipitation. Recycling of neutralised slurry to the first continuously stirred tank reactor provides seeds for enhanced crystalline precipitation. Lime or limestone neutralising agent is added to the seeded acid solution to increase the pH and further selectively precipitate stable ferric arsenate compounds.

Thus, according to the invention, there is provided a method of selectively precipitating arsenic from a solution containing copper, ferric iron and ferrous iron whilst minimising copper losses, which includes the steps of:
(a) introducing an acidic solution containing arsenic (V), copper, ferric iron and ferrous iron into a first tank of a series of continuously stirred tank reactors and, in the first tank,
(b) adding air to the solution;
(c) heating the solution to an elevated temperature;
(d) recycling a portion of selectively precipitated ferric arsenate compounds to the said first tank; and
(e) seeding the solution with ferric arsenate compounds.

Preferably the seeding occurs to provide seeds for enhanced crystalline formation.

The molar ratio of iron to arsenic of the solution may be at least 1.

Air may be added, in step (b), to oxidise the ferrous iron to ferric iron.

The solution may be heated, in step (c), to increase the rate of ferric arsenate precipitation and to minimise copper co-precipitation.

The said elevated temperature may be above 60° C. and below 100° C.

The method of the invention is preferably conducted at atmospheric pressure.

The method may include the step of:
(f) transferring solution from the said first tank to a second tank in the series of continuously stirred tank reactors.

The method may include the steps, in the second tank, of:
(g) adding air to the solution;
(h) heating the solution to an elevated temperature; and
(i) selectively precipitating ferric arsenate compounds from the seeded aqueous solution with a first calcium-containing neutralising agent.

Preferably the molar ratio of iron to arsenic of the seeded solution in the second tank is at least 1.

Air may be added, in step (g), to oxidise ferrous iron of the seeded solution to ferric iron.

The solution may be heated, in step (h), to increase the rate of ferric arsenate precipitation and to minimise copper co-precipitation.

The elevated temperature in step (h) is preferably above 60° C. and below 100° C.

The precipitation of ferric arsenate compounds in step (i) is preferably conducted at atmospheric pressure and, preferably, at a pH of at least about 1,5.

The first neutralising agent used in step (i) may be limestone.

The invention may include the step of:
(j) transferring solution from the second tank to a third tank in the series of continuously stirred tank reactors.

The method may include the steps, in the third tank, of:
(k) adding air to the solution;
(l) heating the solution to an elevated temperature; and
(m) selectively precipitating ferric arsenate compounds from the solution with a second calcium-containing neutralising agent.

Preferably the molar ratio of iron to arsenic of the solution in the third tank is at least 1.

Air may be added, in step (k), to oxidise ferrous iron of the solution to ferric iron. Step (l) may be used to increase the rate of ferric arsenate precipitation and to minimise copper co-precipitation.

The elevated temperature in step (l) is preferably above 60° C. and below 100° C.

The precipitation of ferric arsenate compounds in step (m) is preferably conducted at atmospheric pressure and, preferably, at a pH of at least about 1,9.

The second neutralising agent used in step (m) may be limestone.

The invention may include the step of:
(n) transferring solution from the third tank to a final tank in the series of continuously stirred tank reactors.

The method may include the steps, in the final tank, of:
(o) adding air to the solution;
(p) heating the solution to an elevated temperature; and
(q) selectively precipitating ferric arsenate compounds from the solution by holding the solution in the final tank.

Preferably the molar ratio of iron to arsenic of the solution in the final tank is at least 1. Air may be added, in step (o), to oxidise ferrous iron of the solution to ferric iron.

Step (p) may be used to increase the rate of ferric arsenate precipitation and to minimise copper co-precipitation.

The elevated temperature in step (p) may be above 60° C. and below 100° C.

The selective precipitation of ferric arsenate compounds in step (q) is preferably conducted at atmospheric pressure.

The solution from the final tank may be transferred to a separation unit wherein separation is undertaken to form a solid phase and a liquid phase.

A portion of the solid phase may be recycled to the said first tank.

BRIEF DESCRIPTION OF THE DRAWINGS

The invention is further described by way of examples with reference to the accompanying drawings in which.

DESCRIPTION OF PREFERRED EMBODIMENTS

The invention provides a method of selective precipitation of arsenic from acidic solutions containing copper, ferric iron and ferrous iron in an environmentally acceptable manner. The method includes pH adjusting the acid solution in a series of aerated continuously stirred tank reactors. The reactors are maintained at elevated temperatures to increase the rate of ferric arsenate compound precipitation and to minimise copper co-precipitation. Recycling of neutralised solution to a first continuously stirred tank reactor provides seeds for enhanced crystalline precipitation. Lime or limestone neutralising agent is added to the seeded acid solution to increase the pH and further selectively precipitate stable ferric arsenate compounds.

As is described hereinafter with reference to FIGS. 2 to 5 the position at which the method of the invention is carried out, within the bacterial oxidation process, does not affect the method which can therefore be conducted on different process streams according to requirement.

Figure 1:
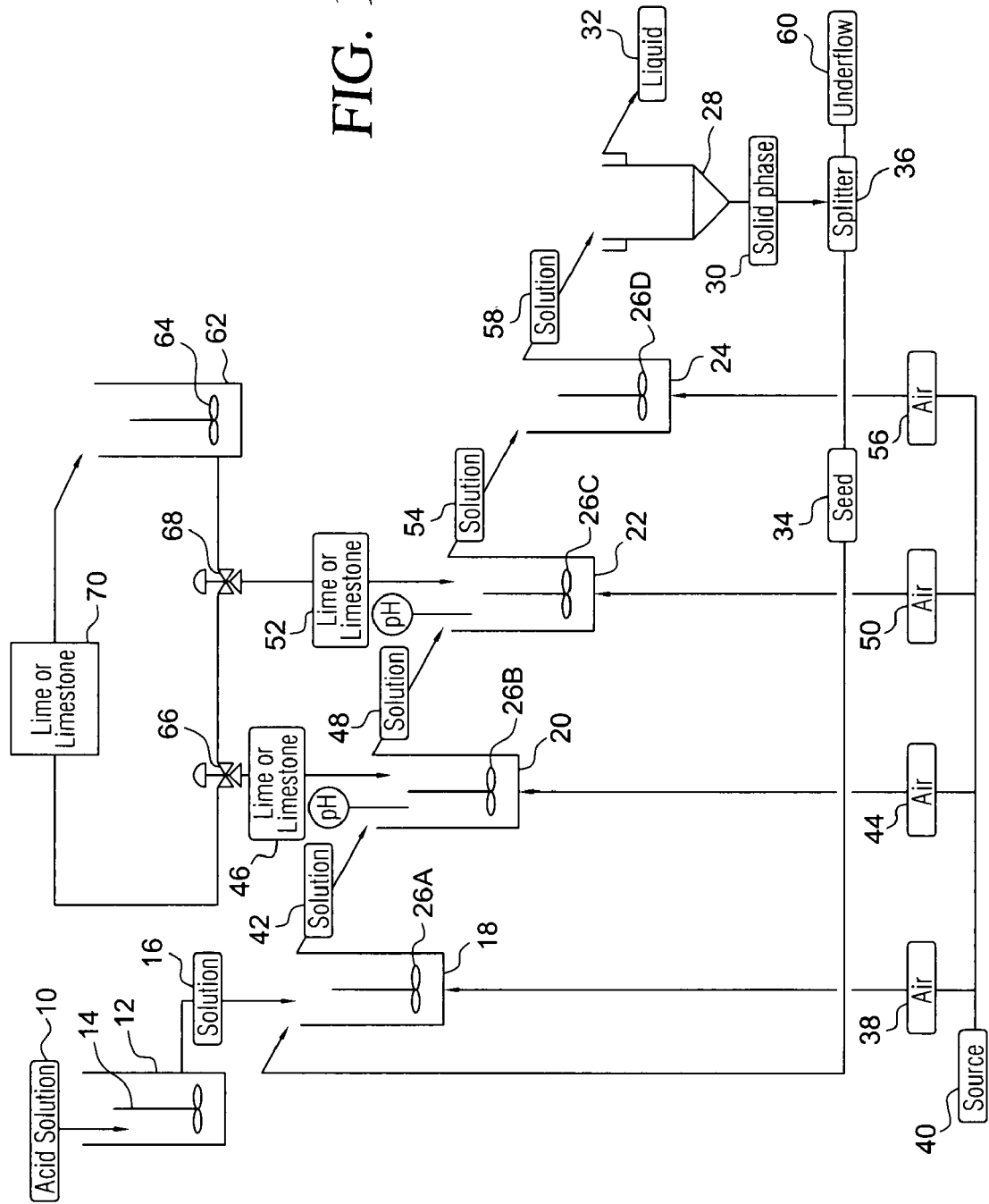
FIG. 1 is a schematic flow sheet illustrating the selective precipitation of stable ferric arsenate compounds in accordance with the method of the invention.

FIG. 1 is a schematic representation of the method of the invention. An acidic solution 10 containing arsenic (V), copper, ferric iron and ferrous iron is fed into a feed tank 12 which has an agitator 14. The molar ratio of iron:arsenic of the solution is at least 1.

Solution 16 from the feed tank 12 is pumped to a first tank 18 of a series of four continuously stirred tank reactors labelled 18, 20, 22 and 24 which respectively have agitators 26A to 26D.

Solution (58) from the fourth tank 24 is directed to a thickener 28 which produces a solid phase 30 and a liquid phase 32. As is apparent from the following description the solid phase includes selectively precipitated ferric arsenate compounds and a portion 34 thereof, produced by a splitter 36, is recycled to the first tank 18 in order to seed the solution 16 with ferric arsenate compounds. This provides seeds for enhanced crystalline formation.

The first tank 18 is operated at atmospheric pressure. Air 38 from a source 40 is added to the tank 18 to oxidise a portion of the ferrous iron in the tank to ferric iron. The solution in the first tank is heated to an elevated temperature of between 60° C. and 100° C. to increase the rate of ferric arsenate compounds precipitation and to minimise copper co-precipitation.

Solution 42 from the first tank is transferred to the second tank 20 which is also operated at atmospheric pressure. Air 44 is added to the tank 20 to oxidise a portion of the ferrous iron in the tank to ferric iron. The solution in the second tank is heated to an elevated temperature of between 60° C. and 100° C. to increase the rate of ferric arsenate precipitation and to minimise copper co-precipitation. Lime or limestone 46 is added to the tank 20 to selectively precipitate ferric arsenate compounds from the seeded solution. The addition of limestone is controlled so that the pH of the solution in the second tank is maintained at a pH of at least about 1,5.

Solution 48 from the tank 20 is transferred to the third tank 22. This tank is also operated at atmospheric pressure and air 50 is added to the solution in the third tank to oxidise a portion of the ferrous iron to ferric iron. The solution in the third tank is heated to an elevated temperature of between 60° C. and 100° C. to increase the rate of ferric arsenate compounds precipitation and to minimise copper co-precipitation. Lime or limestone 52 is added to the solution in the tank 22 to selectively precipitate ferric arsenate compounds from the seeded solution with the addition of lime or limestone being controlled so that the pH of the solution in the third tank is maintained at a pH of at least about 1,9.

Solution 54 from the third tank is transferred to the fourth tank 24 which is operated at atmospheric pressure. Air 56 is added to the solution in the fourth tank to oxidise a portion of the ferrous iron in the solution to ferric iron. The solution is heated to an elevated temperature of between 60° C. and 100° C. to increase the rate of ferric arsenate compound precipitation and to minimise copper co-precipitation.

As has been previously indicated the solution 58 from the fourth tank is transferred to the separation unit 28 which forms a low solution content phase 30 and a liquid phase 32. A portion 34 of the low solution content phase is recycled as seed material to the first tank 18. The overflow 32 of the separation unit or thickener 28 can, according to the application, form different streams in the flow charts of FIGS. 2 to 5. The underflow 60 of the separation unit is filtered to form a disposable cake.

The source 40 is used to provide the air 38, 44, 50 and 56 to each of the tanks 18 to 24 respectively. The lime or limestone 46 and 52, as the case may be, supplied to the tanks 18 and 20, is fed from a tank 62 which contains an agitator 64. The addition of limestone to the two tanks 18 and 20 is controlled by respective valves 66 and 68. Unused lime or limestone 70 is returned to the tank 62. The lime or limestone solution is made up with water.

As has been stated the position within a bacterial oxidation process at which stable ferric arsenate compounds (Neutral) are selectively precipitated does not affect the method of the invention. Thus the flow sheet shown in FIG. 1 remains unaltered when the position, at which the method of the invention is implemented, within a bacterial oxidation process, is altered. FIGS. 2 to 5 illustrate different possible locations at which the method of the invention can be carried out in a bacterial oxidation process.

Figure 2:
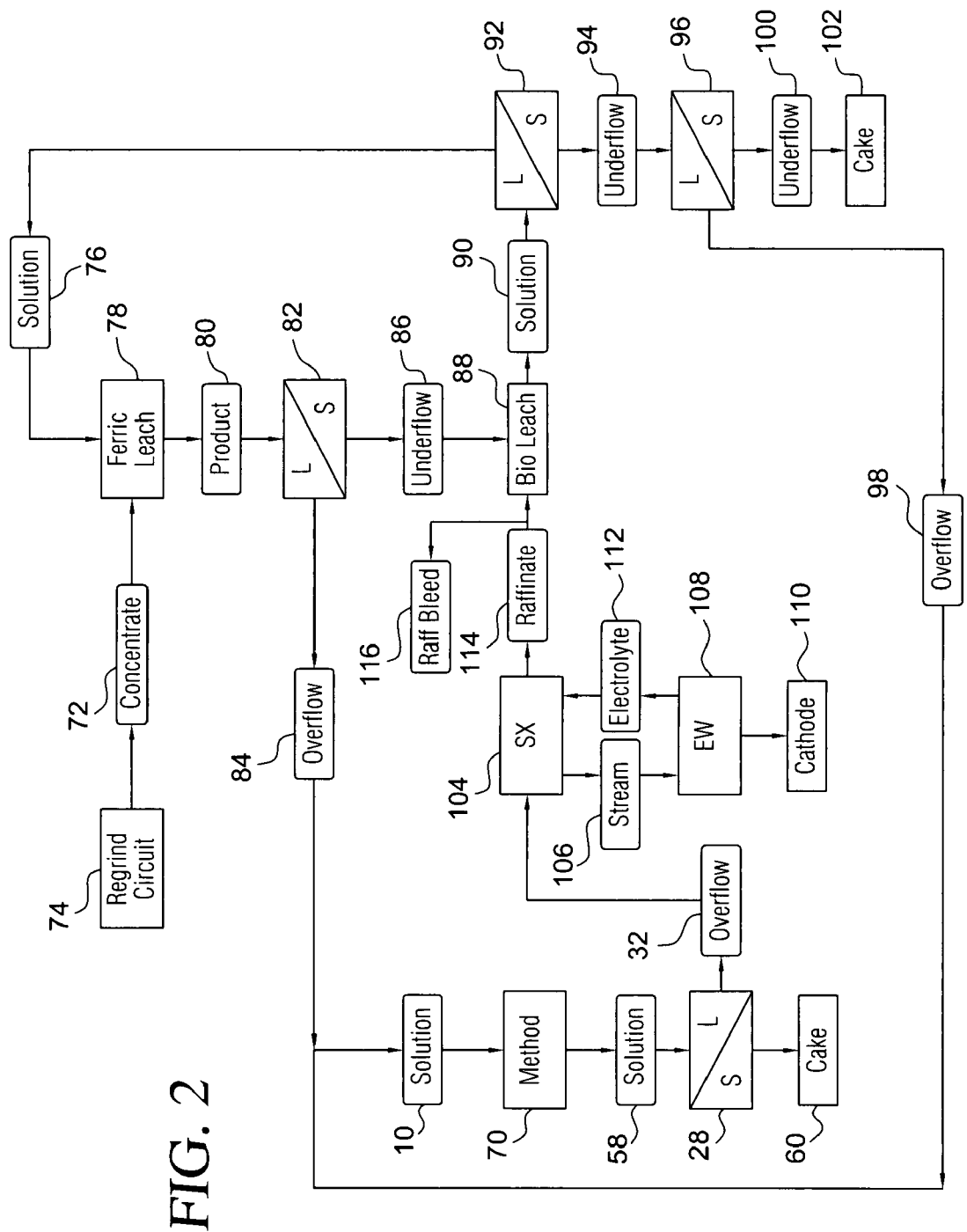
FIG. 2 illustrates the use of the method shown in FIG. 1 on a PLS solution produced by a ferric pre-leach stage in a bacterial oxidation process.

FIG. 2 shows the thickener 28 in block diagram form giving rise to the overflow stream 32 and the underflow stream 60. The other components of the flow sheet of FIG. 1 are collectively represented by a block labeled 70. The remaining elements in FIG. 2 are briefly described.

Concentrate 72 from a regrind circuit 74 and a solution 76 are fed into a ferric pre-leach reactor 78. The solution 76 is an acidic solution containing copper, arsenic (V) and ferric iron. In the reactor 78 oxidation of sulphide minerals occurs. The product 80 of the ferric pre-leach reactor flows into a thickener 82. Overflow 84 from the thickener contains copper, arsenic (V) and ferrous and ferric iron. Underflow 86 from the thickener reports to a bioleaching phase 88 which produces a solution 90 containing copper, arsenic (V) and ferric iron and which is directed into a decant thickener 92. The thickener overflow is the solution 76. The underflow 94 of the thickener is pumped to counter current decant (CCD) thickeners 96 for washing. The overflow product 98 and the solution 84 from the thickener 82, in combination, make up the acid solution 10 which is fed to the tank 12 in FIG. 1. The underflow product 100 is filtered to form a cake 102 for disposal.

The overflow solution 32 from the thickener 28 is fed to a solvent extraction plant 104 in which the solution is contacted with an organic solvent extractant and copper in the solution is transferred to the extractant. Copper is then stripped from the extractant to form a stream 106 which is reported as an advance electrolyte to an electrowinning stage 108 where the copper is plated onto cathodes 110. The spent electrolyte 112 is returned to the solvent extraction plant 104.

The plant 104 produces a raffinate 114 which is predominantly returned to the bioleach stage 88 although a portion is bled (step 116) to remove impurities from the SX/EW circuit.

Figure 3:
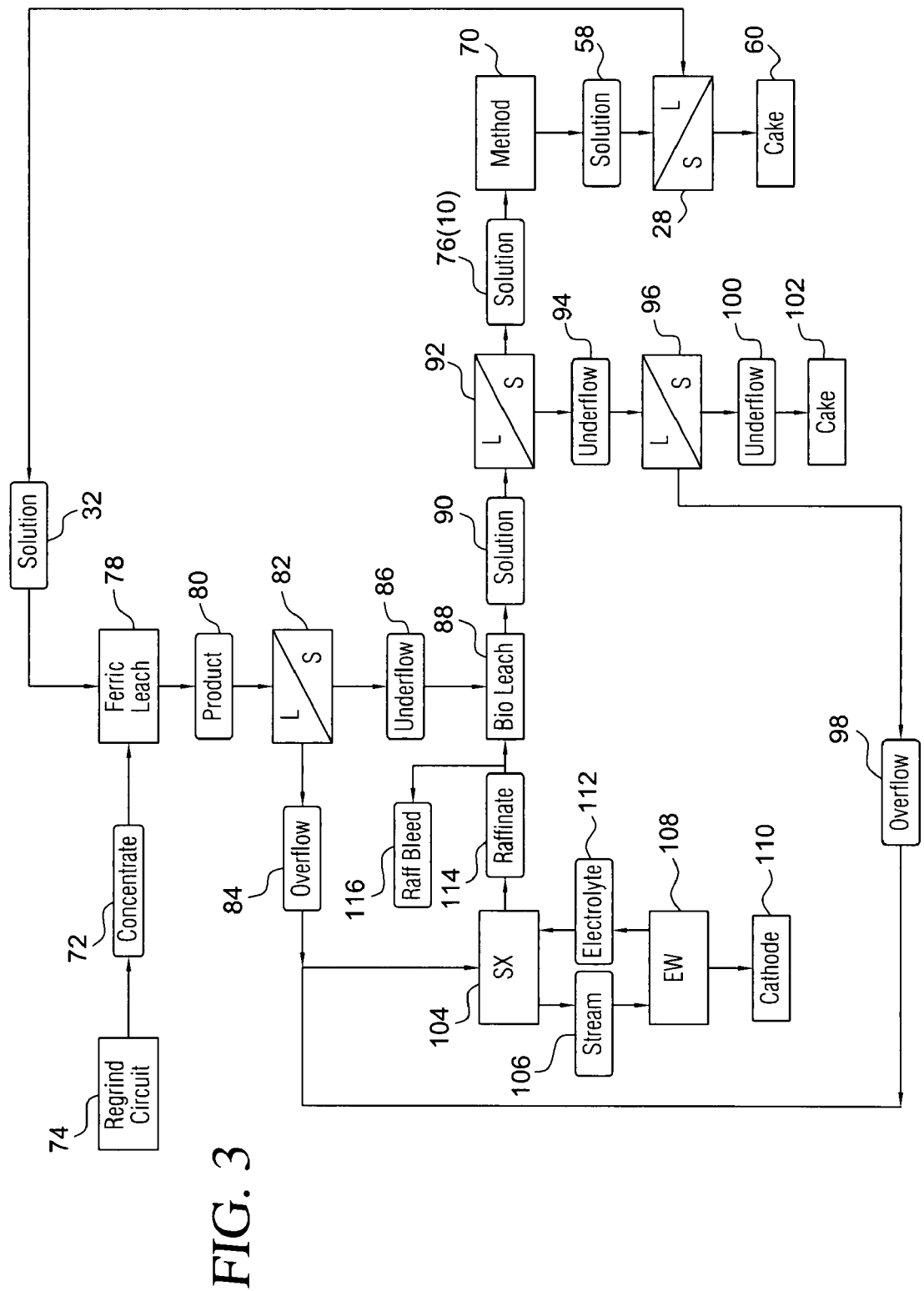
FIG. 3 illustrates the use of the method of the invention in a bacterial oxidation decant thickener overflow solution.

With the arrangement of FIG. 2 the feed stream to the process for selectively precipitating stable ferric arsenate compounds is a combination of the solutions 84 and 98. In FIG. 3 on the other hand the overflow 76 from the decant thickener 92 constitutes the feed 10 to the process 70 of the invention. In other respects the process steps shown in FIG. 3 are similar to those which have been described in connection with FIG. 2.

Figure 4:
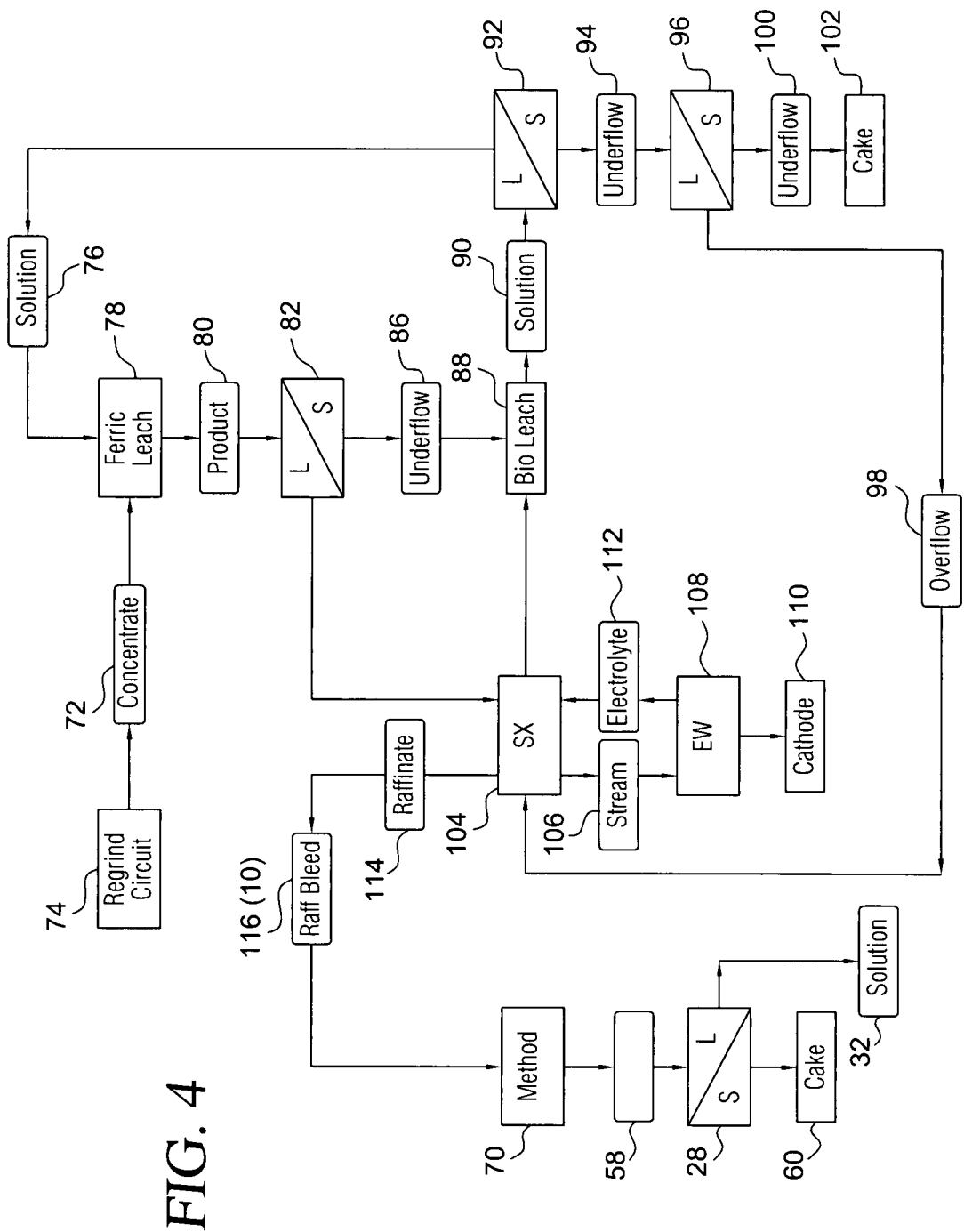
FIG. 4 shows the use of the method of the invention in a raffinate solution produced by a solvent extraction/electrowinning circuit.
Figure 5:
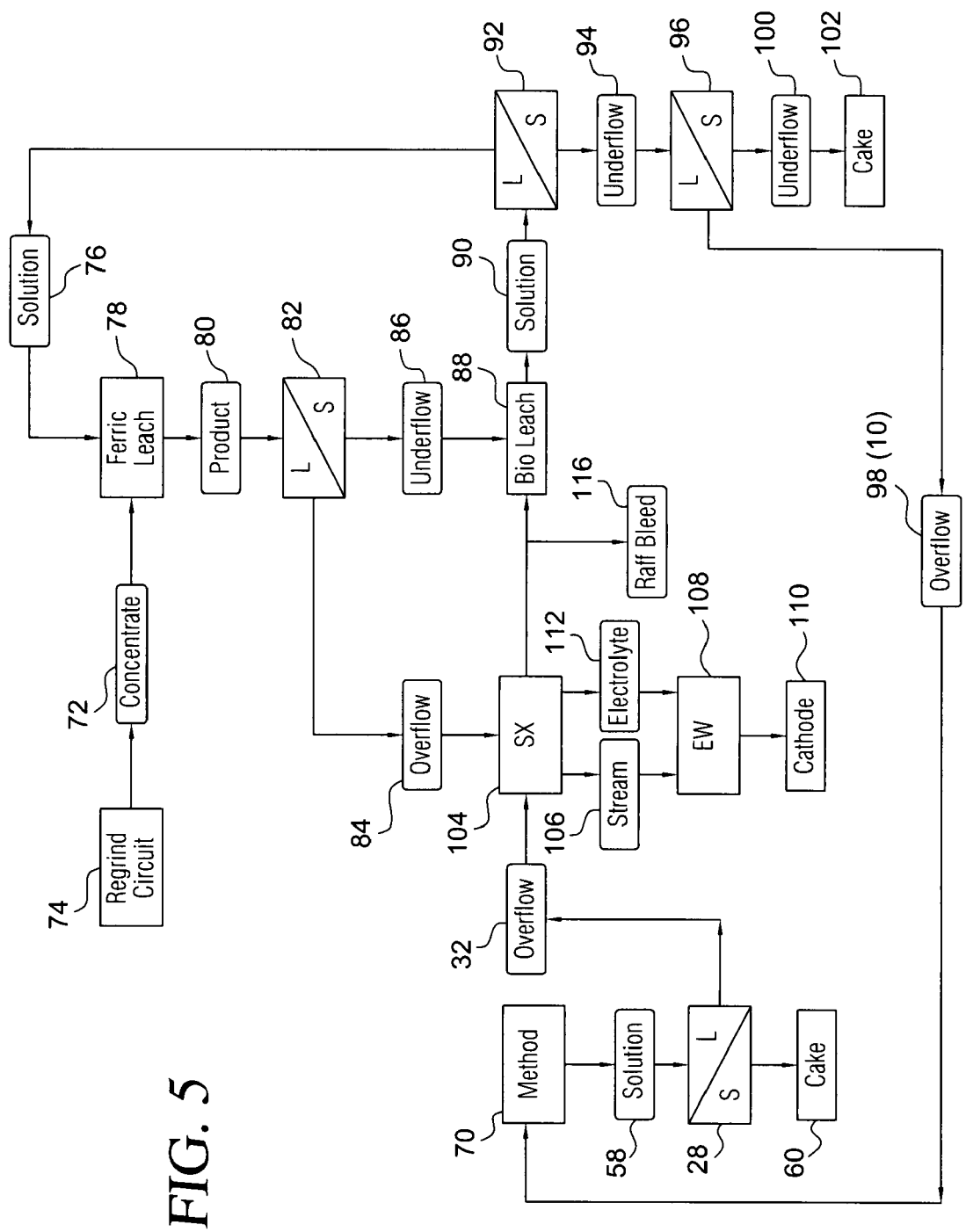
FIG. 5 shows the use of the method of the invention in bacterial oxidation counter current decant (CCD) wash water.

In the approach illustrated in FIG. 4 the bleed 116 of the raffinate solution 114 provides the feed 10 to the method 70 of the invention. In FIG. 5 on the other hand the overflow product 98 of the CCD thickeners 96 is the feed, alone, to the method block 70 and the solution 84, in this case, is not combined with the product 98 but is directly transferred to the solvent extraction step 104.

The invention claimed is:

1. A method of selectively precipitating arsenic from a solution containing copper, ferric iron and ferrous iron whilst minimising copper losses which includes the steps of:

(a) introducing an acidic solution containing arsenic(V), copper, ferric iron and ferrous iron in succession into each of a series of continuously stirred tank reactors;

(b) adjusting the pH of the solution in each of said tank reactors and adding air to the solution to oxidise a portion of the ferrous iron to ferric iron and heating the solution to an elevated temperature to increase the rate of ferric arsenate precipitation and to minimise copper co-precipitation;

(c) recycling a portion of selectively precipitated ferric arsenate compounds exiting a final tank in the series to a first tank in the series;

(d) seeding the solution with ferric arsenate compounds to provide seeds for enhanced crystalline formation;

(e) maintaining the pH of the solution in a second tank in the series at a pH of at least 1.5 and selectively precipitating ferric arsenate compounds from the seeded aqueous solution with a first calcium-containing neutralising agent; and (f) maintaining the pH of the solution in a third tank in the series at a pH which is higher than the pH in the second tank and which is at least 1.9 and selectively precipitating ferric arsenate compounds from the solution with a second calcium-containing neutralising agent.

2. The method according to claim 1 wherein the molar ratio of iron to arsenic of the solution is at least 1.

3. The method according to claim 1 wherein the elevated temperature in step (b) is above 60° C. and below 100° C.

4. The method according to claim 1 wherein steps (a) through (e) are conducted at atmospheric pressure.

5. The method according to claim 1 wherein the first neutralising agent used in step (e) is limestone.

6. The method according to claim 1 wherein the second neutralising agent is limestone.

* * * * *